United States Patent
Guidi

(10) Patent No.: US 6,812,438 B2
(45) Date of Patent: Nov. 2, 2004

(54) COVERING FOR PROTECTING SURFACES IN GENERAL

(76) Inventor: Gianmaria Guidi, Via Jacopo Robusti, 193, 25134 Brescia (IT)

(*) Notice: Subject to any disclaimer, the term of this patent is extended or adjusted under 35 U.S.C. 154(b) by 0 days.

(21) Appl. No.: 10/680,096

(22) Filed: Oct. 8, 2003

(65) Prior Publication Data

US 2004/0071941 A1 Apr. 15, 2004

(30) Foreign Application Priority Data

Oct. 11, 2002 (IT) .................................. MI2002A2164

(51) Int. Cl.[7] ............................................... H05B 3/44
(52) U.S. Cl. ..................... 219/544; 219/213; 219/545; 219/546
(58) Field of Search ................. 219/544, 546, 219/547, 548, 213; 392/432

(56) References Cited

U.S. PATENT DOCUMENTS

| | | | |
|---|---|---|---|
| 3,153,140 A | * 10/1964 | Theodore et al. ........... | 219/549 |
| 4,054,473 A | 10/1977 | Ohnstad | |
| 4,429,215 A | * 1/1984 | Sakai et al. ................. | 219/528 |
| 4,485,297 A | * 11/1984 | Grise et al. ................. | 219/528 |
| 4,499,923 A | 2/1985 | Hammer | |
| 4,665,309 A | 5/1987 | Derbyshire | |
| 5,829,171 A | * 11/1998 | Weber et al. ................. | 36/93 |
| 6,184,496 B1 | * 2/2001 | Pearce ........................ | 219/213 |

FOREIGN PATENT DOCUMENTS

| | | |
|---|---|---|
| DE | 21 36 656 | 2/1973 |
| DE | 91 00 017 | 4/1991 |
| EP | 0 382 971 | 8/1990 |
| EP | 0 386 428 | 9/1990 |
| EP | 0 913 238 | 5/1999 |

* cited by examiner

*Primary Examiner*—Henry Bennett
*Assistant Examiner*—Vinod Patel
(74) *Attorney, Agent, or Firm*—Guido Modiano; Albert Josif; Daniel O'Byrne

(57) ABSTRACT

A covering for protecting surfaces in general, which comprises a sheet body that forms an internal supporting frame, to which a layer of self-sealing thermoplastic polymer is connected; the layer forms at least one face of the sheet-like body, the sheet-like body having protrusions for engaging a surface to be covered.

16 Claims, 3 Drawing Sheets

COVERING FOR PROTECTING SURFACES IN GENERAL

BACKGROUND OF THE INVENTION

The present invention relates to a covering for protecting surfaces in general.

As is known, in many fields it is necessary to have a covering that allows to protect surfaces.

Considering in particular the case of concrete, there are several degrading agents that can cause chemical aggression by gaseous-phase substances generated by the decomposition of substances of different kinds, as well as chemical aggression by aggressive liquid substances, which is particularly dangerous since penetration in the concrete, which is typically permeable and porous, can occur.

It should be added to the above problems that concrete is subjected to aggression by solid phases, which apply a mechanical action with a continuous abrasion that reduces the mechanical strength of the item.

The solution adopted so far to protect surfaces and in particular concrete have not proved to be capable of fully solving the problem, since currently it is practically impossible to provide a protection by means of a layer that mates tightly with the surface of the concrete and remains stably connected thereto.

SUMMARY OF THE INVENTION

The aim of the invention is to eliminate the drawbacks noted above by providing a covering for protecting surfaces in general that allows to create a surface continuity that prevents contact of the surface with external agents.

Within this aim, an object of the invention is to provide a covering that is capable of achieving very tight contact with the surface to be protected, thus constituting in practice a monolithic assembly.

Another object of the present invention is to provide a covering that thanks to its particular constructive characteristics is capable of giving the greatest assurances of reliability and safety in use.

Another object of the present invention is to provide a covering that can be easily obtained starting from commonly commercially available elements and materials and is further competitive from a merely economical standpoint.

This aim and these and other objects that will become better apparent hereinafter are achieved by a covering for protecting surfaces in general, according to the invention, characterized in that it comprises a sheet-like body that has an internal supporting frame, to which a layer of self-sealing thermoplastic polymer is connected, said layer forming at least one face of said sheet-like body, said sheet-like body forming means for engaging a surface to be covered.

BRIEF DESCRIPTION OF THE DRAWINGS

Further characteristics and advantages of the invention will become better apparent from the description of a preferred but not exclusive embodiment of a covering for protecting surfaces in general, illustrated by way of non-limitative example in the accompanying drawings, wherein.

DESCRIPTION OF THE PREFERRED EMBODIMENTS

Figure 1:
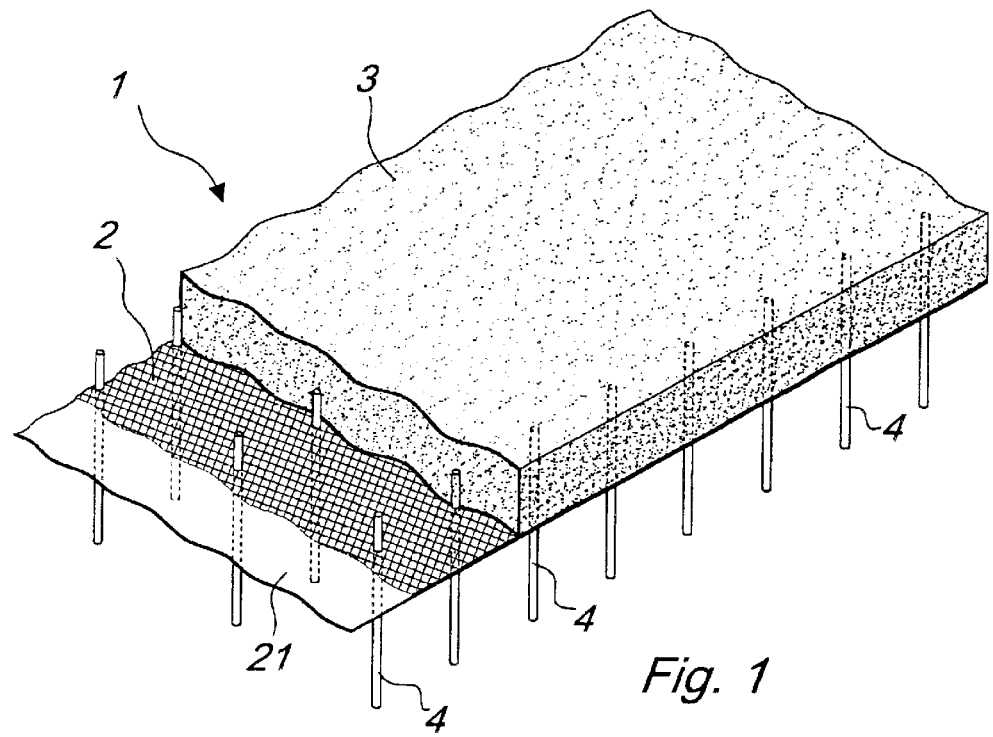
FIG. 1 is a schematic perspective view of a portion of covering according to the invention, taken from the face provided with the layer of self-sealing thermoplastic polymer.
Figure 2:
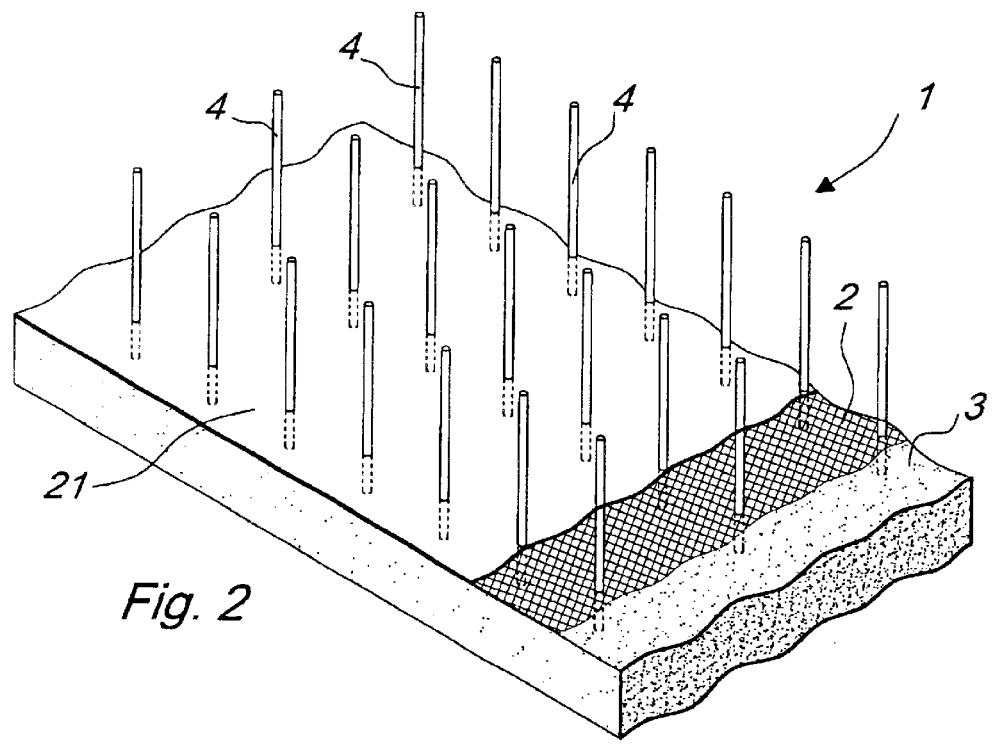
FIG. 2 is a perspective view of the covering, taken from the face provided with the engagement means.

With reference to the figures, the covering for protecting surfaces in general, according to the invention, is constituted by a sheet-like body, generally designated by the reference numeral 1, which is generally constituted by an inner supporting frame, generally designated by the reference numeral 2, which can be provided by a net made of plastics or metal, a layer of fabric, or fibers, or any other element capable of providing a structure that is capable of supporting a layer 3 made of a self-sealing thermoplastic polymer that in practice forms a face of the covering.

Preferably on the opposite face with respect to the polymer layer, means are provided for engaging the sheet-like body to the surface to be covered.

The means can be provided by spikes or protrusions 4, which are connected to the net or at least partially embedded in the polymer layer and are adapted to form projections which are for example embedded in the concrete cast, thus providing perfect engagement; it is optionally also possible to provide projections that allow to produce a mechanical engagement with the internal iron reinforcement frame of the concrete cast.

The engagement means can be of any kind and accordingly, for example, they can be constituted by fibrous materials that have a rough surface, such as carpeting or the like, which allow to use building or industrial adhesives, such as epoxy or neoprene adhesives, to provide a perfect bonding.

The covering thus obtained can be directly provided with integrated heating means, constituted by resistors 10 or the like, which can be of any kind and are embedded beforehand at the joining edges of the various portions of sheet-like body, so as to be able to easily provide a joint simply by producing electrical heating by way of the resistors, which cause a localized melting of the thermoplastic polymer, thus achieving a perfect joining and sealing; the resistors are connected to protruding power supply cables for connection to an electrical power source.

The sheet-like element can also be provided without the embedded and integrated heating means constituted by the resistor, and in this case it is possible to resort to the use of an external self-sealing gasket, designated by the reference numeral 12, which is provided by means of a heat diffusion or distribution layer 13, i.e. of the adhesive or non-stick type and on which a (self) sealing layer 14, preferably made of the same thermoplastic polymer, is applied.

The heat distribution layer is advantageously constituted by a material, such as micalite or the like, that is an electrical insulator but can convey heat uniformly.

In this manner, it is possible to superimpose the gasket in the joining regions and resort, for example, to an external heating element, generally designated by the reference numeral 15, which is arranged in contact with the heat diffusion layer 13 in order to perform the function of both the thermoplastic polymer 14 of the gasket and of the thermoplastic polymer that constitutes the sheet-like body 1.

Figure 3:
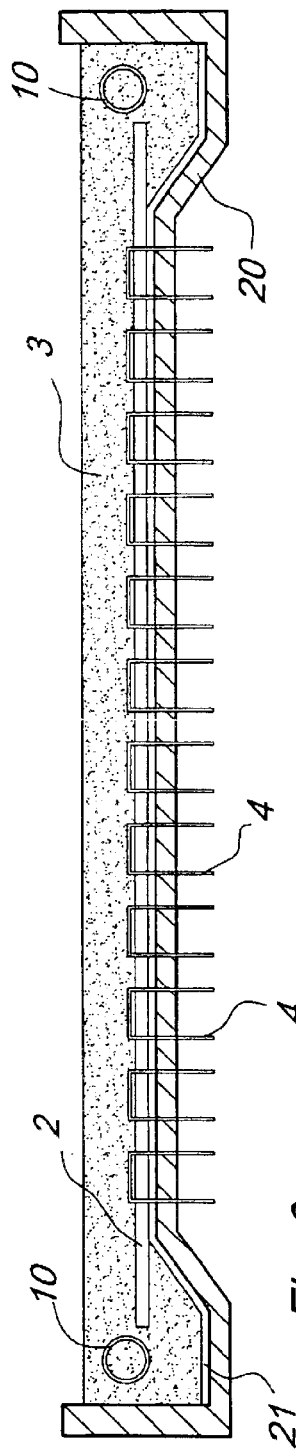
FIG. 3 is a schematic, cross-sectional view of a mold for providing the covering with integrated heating means for sealing.
Figure 4:
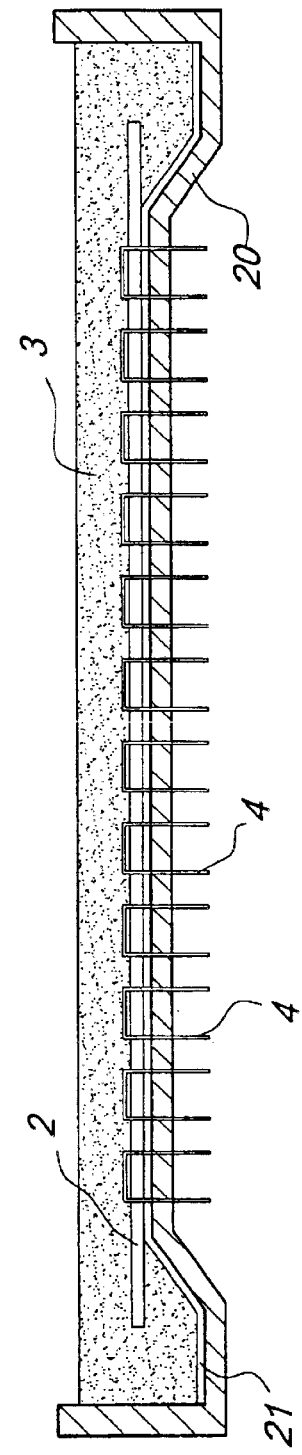
FIG. 4 is a schematic, cross-sectional view of a mold for forming the covering without integrated heating means.
Figure 5:
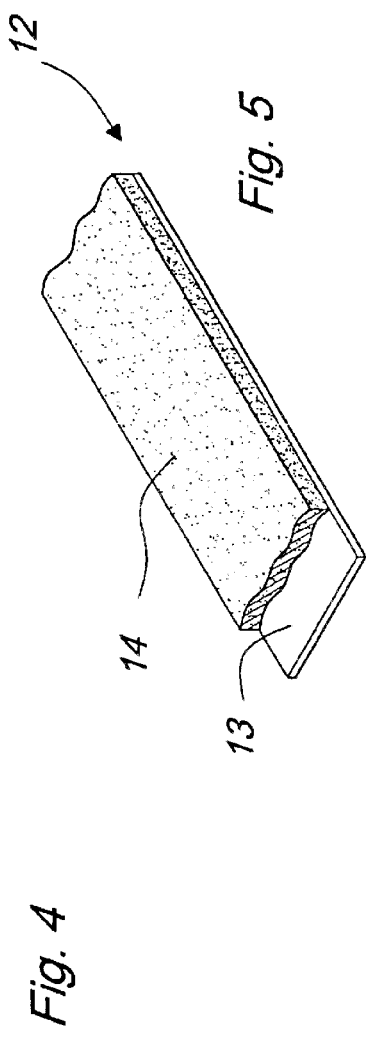
FIG. 5 is a perspective view of a self-sealing gasket.
Figure 6:
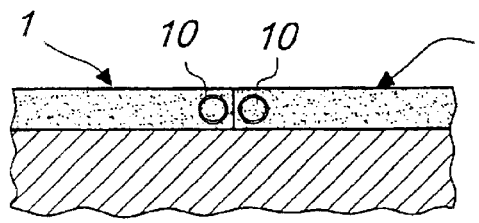
FIG. 6 is a cross-sectional view of the adjacent arrangement of flaps of covering by means of integrated and side-by-side heating elements.

For the sake of completeness in description, it should also be added that it is possible to use molds, designated by the reference numeral 20 in FIGS. 3 and 4, that can be coated with Teflon in order to facilitate separation or on the bottom of which it is possible to provide a release layer 21, which then remains integrated in the covering, on which the frame 2 is arranged, and the engagement means constituted, for example, by the spikes 4; then the thermoplastic polymer 3 is applied by applying the powder, which is heated to the selected temperature.

Figure 7:
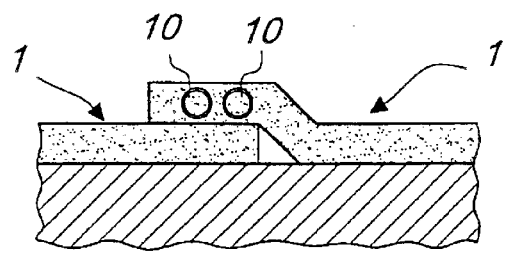
FIG. 7 is a cross-sectional view of the overlapping adjacent arrangement of two flaps with integrated heating.
Figure 8:
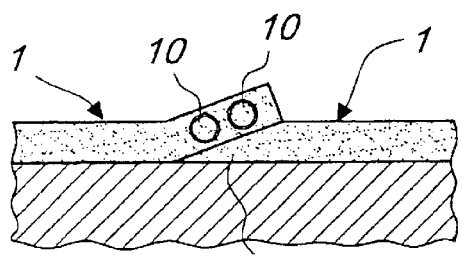
FIG. 8 is a cross-sectional view of the overlapping adjacent arrangement of a flap with integrated heating and a beveled flap.
Figure 9:
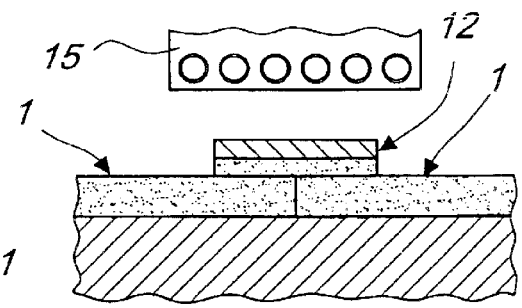
FIG. 9 is a cross-sectional view of the covering with application of a self-sealing gasket with external heating elements.
Figure 10:
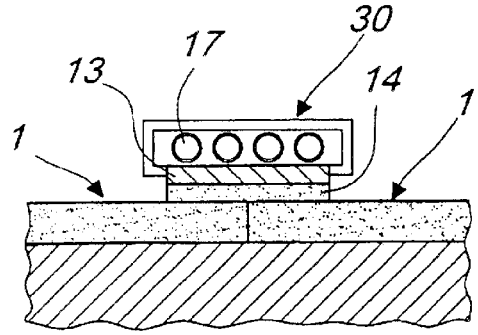
FIG. 10 is a cross-sectional view of the covering with application of a self-sealing gasket with integrated heating means.

In order to join the various portions of sheet-like bodies, as shown schematically in FIGS. 6 to 11, it is possible to either provide the heating elements 10 so that they are directly integrated in the edges of the two opposite flaps or, as shown in FIG. 7, it is possible to provide the heating elements 10 on a single edge, which is fully superimposed on the other flap or edge to be joined or optionally superimposed, as shown in FIG. 8, on the beveled edge of the opposite flap, designated by the reference numeral 3a.

It is also possible to provide a gasket with integrated or internal heating means, generally designated by the reference numeral 30, which is provided in a downward region with a sealing layer, again designated by the reference numeral 14, on which a conducting layer 13 is superimposed, heating means 17 of the disposable type being connected to said conducting layer.

Figure 11:
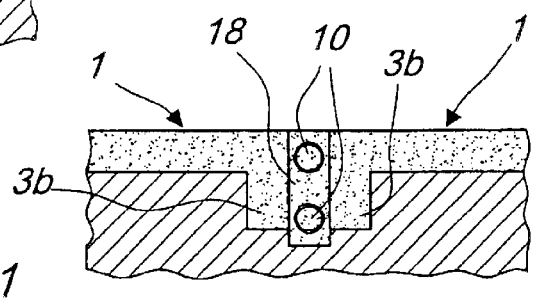
FIG. 11 is a cross-sectional view of the covering with interposition of a gasket with integrated heating means between the flaps to be connected.

As shown in FIG. 11, it is also possible to provide folded edges or flaps 3b for the layers made of thermoplastic polymer, between which a front gasket with heating, generally designated by the reference numeral 18, is interposed.

Experimental tests that have been conducted have shown that the optimum thermoplastic polymer to be used is a polymer based on polyolefins modified with acid groups in order to develop polar bonds, such as PPA571 by PLAS-COAT; it is obviously possible to use products that have different characteristics, without altering the principle that it is necessary to use a material that is thermoplastic so as to be able to achieve the melting that allows to provide a continuous surface.

From the above description it is evident that the invention achieves the intended aim and objects, and in particular the fact is stressed that a covering is provided which is substantially based on the use of a layer of self-sealing thermoplastic material that can be made to melt, both in factory and directly on site, so as to form a joint that allows to achieve surface continuity of the items being manufactured.

Melting can be achieved either by heating means directly provided inside the sheet-like body or by heating means that are applied from the outside.

Finally, a particular aspect of the invention is constituted by the fact that the sheet-like body is preset to monolithically engage the surface to be protected, thus forming a monolithic assembly that is easily capable of withstanding stresses over time.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements.

The disclosures in Italian Patent Application No. MI2002A002164 from which this application claims priority are incorporated herein by reference.

What is claimed is:

1. A covering for protecting surfaces in general, comprising a sheet body provided with an internal supporting frame; a layer of self-sealing thermoplastic polymer connected to said supporting frame, said layer forming at least one face of said sheet body; and engagement means, provided at said sheet body for engaging a surface to be protected.

2. The covering of claim 1, wherein said supporting frame is provided by a net made of plastic material or metal.

3. The covering of claim 1, wherein said supporting frame is provided by a layer of fabric or fibers.

4. The covering of claim 1, wherein said engagement means are constituted by spikes that protrude from said sheet-like body.

5. The covering of claim 1, wherein said engagement means are constituted by a rough surface.

6. The covering of claim 1, further comprising heating means that are integrated in said layer of self-sealing thermoplastic polymer to provide sealing heating to said self-sealing layer.

7. The covering of claim 1, further comprising an external self-sealing gasket that is applied to said layer of self-sealing thermoplastic polymer in order to produce localized melting with consequent sealing.

8. The covering of claim 7, wherein said external self-sealing gasket has internal heating means for providing sealing heating.

9. The covering of claim 7, wherein said external self-sealing gasket has external heating means for providing sealing heating.

10. The covering of claim 7, wherein said external self-sealing gasket comprises an electrically insulating heat distribution layer on which a self-sealing thermoplastic polymer layer is applied.

11. The covering of claim 1, further comprising a mold, said sheet body comprising, on a face thereof that lies opposite a face provided with said layer of thermoplastic polymer, a release layer that is adapted to act as an element for containing, inside the mold, powder to be heated in order to obtain the thermoplastic polymer.

12. The covering of claim 1, formed by a plurality of said sheet bodies that have heating elements integrated in edges of two opposite flaps thereof.

13. The covering of claim 1, formed by a plurality of said sheet bodies that have heating elements formed in a single edge of a flap of a sheet body that can overlap a further flap or edge of an adjacent sheet body to be joined thereto.

14. The covering of claim 1, formed by a plurality of said sheet bodies, wherein said adjacent layers of thermoplastic polymer have folded flaps between which a front gasket is interposed which is provided with heating means for providing sealing heating.

15. The covering of claim 1, wherein said layer of self-sealing thermoplastic polymer is constituted by a plurality of overlapping chemically compatible layers of thermoplastic polymers.

16. The covering of claim 1, wherein said self-sealing thermoplastic polymer is constituted by polyolefins modified with acid groups in order to develop polar bonds.

* * * * *